(12) United States Patent
Dierickx et al.

(10) Patent No.: US 11,089,150 B2
(45) Date of Patent: Aug. 10, 2021

(54) METHOD AND NETWORK ANALYZER OF EVALUATING A COMMUNICATION LINE

(71) Applicant: Nokia Solutions and Networks Oy, Espoo (FI)

(72) Inventors: Philippe Dierickx, Saint-Gery (BE); Benoit Drooghaag, Ophain-Bois-Seigneur-Isaac (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/639,197

(22) PCT Filed: Aug. 28, 2018

(86) PCT No.: PCT/EP2018/073126
§ 371 (c)(1),
(2) Date: Feb. 14, 2020

(87) PCT Pub. No.: WO2019/042998
PCT Pub. Date: Mar. 7, 2019

(65) Prior Publication Data
US 2021/0037131 A1    Feb. 4, 2021

(30) Foreign Application Priority Data

Sep. 1, 2017 (EP) .................................... 17189099

(51) Int. Cl.
*H04M 3/30* (2006.01)
*H04M 3/08* (2006.01)
*H04M 3/22* (2006.01)

(52) U.S. Cl.
CPC .......... *H04M 3/306* (2013.01); *H04M 3/085* (2013.01); *H04M 3/2209* (2013.01); *H04M 3/2245* (2013.01)

(58) Field of Classification Search
CPC .......... H04M 3/306; H04M 3/08; H04M 3/30; H04M 3/305; H04M 11/062;
(Continued)

(56) References Cited

U.S. PATENT DOCUMENTS 5,912,960 A * 6/1999 Sanford .................. H04M 3/22
                                                    379/201.03
7,027,405 B1    4/2006 Khadavi
(Continued)

FOREIGN PATENT DOCUMENTS

| EP | 3099005 A1 | 11/2016 |
| WO | WO-2016114776 A1 | 7/2016 |
| WO | WO-2017167824 A1 | 10/2017 |

*Primary Examiner* — Binh Kien Tieu
(74) *Attorney, Agent, or Firm* — Harness, Dickey & Pierce, P.L.C.

(57) ABSTRACT

The method includes obtaining a loop length of a terminal section of the communication line; determining whether there is an impairment in the communication line; if no impairment, classifying the communication line into the first group; if impairment is determined, perform obtaining a location of the impairment in the communication line; determining whether the impairment is located in the terminal section of the communication line based on the loop length; if so, classifying the communication line into a second group; else, classifying the communication line into the first group; wherein, in the first group, it is qualified for an new broadband communication service, and if in the second group, it is not qualified, and wherein, the new broadband communication service is to be deployed over the terminal section of the communication line.

13 Claims, 4 Drawing Sheets

(58) Field of Classification Search
CPC .. H04M 3/2209; H04M 3/085; H04M 3/2227; H04M 3/2245; H04M 3/26; H04L 41/0213; H04L 41/0803; H04L 41/0853; H04L 41/145
USPC .......................... 379/1.01, 1.03, 27.01, 29.01
See application file for complete search history.

(56) References Cited

U.S. PATENT DOCUMENTS

| | | | |
|---|---|---|---|
| 7,620,154 B2* | 11/2009 | Cambron | H04L 12/2854 379/1.03 |
| 8,345,560 B2* | 1/2013 | Beattie, Jr. | H04L 43/00 370/249 |
| 9,071,678 B2* | 6/2015 | Yang | H04M 3/2254 |
| 9,100,472 B2* | 8/2015 | Beattie, Jr. | H04M 1/24 |
| 9,246,614 B2* | 1/2016 | Berg | H04M 11/062 |
| 9,461,704 B2 | 10/2016 | Pathak et al. | |
| 10,051,117 B2* | 8/2018 | Zahedi | H04L 41/0677 |
| 10,263,866 B2* | 4/2019 | Kerpez | H04L 43/08 |
| 10,523,810 B2* | 12/2019 | Mohseni | H04L 41/0677 |
| 2003/0007605 A1 | 1/2003 | Rosen et al. | |
| 2004/0028189 A1* | 2/2004 | Bauer | H04M 3/30 379/1.01 |
| 2004/0264684 A1* | 12/2004 | Gao | H04M 3/306 379/406.01 |
| 2007/0230667 A1* | 10/2007 | Warner | H04M 3/306 379/27.01 |
| 2010/0061249 A1 | 3/2010 | Rius i Riu et al. | |
| 2011/0188640 A1* | 8/2011 | Cioffi | H04L 41/0803 379/27.01 |
| 2012/0020277 A1* | 1/2012 | Kanellakopoulos | H04L 5/1461 370/315 |
| 2012/0250744 A1 | 10/2012 | Humphrey et al. | |
| 2014/0161167 A1* | 6/2014 | Zheng | H04B 3/48 375/225 |
| 2016/0337512 A1 | 11/2016 | Kalavai | |
| 2018/0027113 A1* | 1/2018 | Mohseni | H04M 3/085 379/22.04 |
| 2019/0305816 A1* | 10/2019 | Vanderhaegen | H04M 11/062 |
| 2020/0287810 A1* | 9/2020 | Kerpez | H04L 12/2858 |

* cited by examiner

METHOD AND NETWORK ANALYZER OF EVALUATING A COMMUNICATION LINE

CROSS-REFERENCE TO RELATED APPLICATIONS

This application is a national phase under 35 U.S.C. § 371 of PCT International Application No. PCT/EP2018/073126 which has an International filing date of Aug. 28, 2018, which claims priority to European Patent Application No. 17189099.9, filed Sep. 1, 2017, the entire contents of each of which are hereby incorporated by reference.

FIELD OF THE INVENTION

The invention relates to communication technology, in particular to a Digital Subscriber Line (DSL) network.

BACKGROUND

Technologies improved with the growing demand of bandwidth usage in the Access Network. From initial Asymmetric Digital Subscriber Line (ADSL) technology, it evolved to ADSL2/ADSL2+ and VDSL2 (Very High Speed DSL) to provide the necessary bandwidth for user application like High Speed Internet (HSI), Voice over IP (VoIP), video streaming, etc.

As technology evolves, to increase the bandwidth, the distance between the access point (or the remote unit) and the Customer-Premises Equipment (CPE) is reducing.

The latest DSL technology being deployed is G.Fast. It provides bandwidths up to 1 Gb/s using a larger frequency spectrum but with the drawback that the copper loop length should be limited to 300 m or 500 m maximum.

G.Fast is designed to provide hundreds of Mb/s but for very short distances. It permits to deliver very high bandwidth to subscribers without having to provide FTTH (Fiber To The Home) which is very costly deployment as the last meters and the in-home works are major part of the cost. G.Fast uses existing copper network for the last meters meaning no new hole in the walls and use existing in-home wiring. It's targeted for a FTTdp (Fiber To The Distribution Point) deployment meaning bringing fiber within meters of the boundary of customers premises.

For sure, when upgrading from an existing DSL technology (ADSL/VDSL2) to G.Fast, the focus is mainly on the last meters of the existing copper loop as the first hundreds of meters will be replaced by fiber technology.

Knowing that G.Fast is using a very large spectrum from 2.2 MHz to 106 MHz (or even up to 212 MHz) and is reaching such high bitrate throughput, it is of the upmost importance that these last meters of the copper loop are healthy (=impairment free). Meaning that they should not contain impairments like Bridge Tap (BT), Degrade Contact (DC) or any other Abnormal Attenuation (AA) which might impact the G.Fast signal resulting in poor performances compared to the theoretical expectation for a specific loop length.

Before planning an upgrade of DSL line to G.Fast, Telecom Operator would like to verify that the latest meters of the existing loop length are healthy so that the bitrate that will be available after the G.Fast upgrade will match the theoretical bitrate of the G.Fast technology rate reach curves.

Thus, an objective of the invention is to determine whether a communication line is recommendable for an upgrade to a new broadband communication service prior to such an upgrade.

SUMMARY OF THE INVENTION

The object of the invention is achieved by the method and the network analyzer in the claims.

According to one aspect of the present invention, there is provided a method of evaluating a communication line in a Digital Subscriber Line, DSL, network, the communication line connecting an access node and an end-user Customer-Premises Equipment, CPE; the method comprising: a) obtaining a loop length (L) of a predetermined terminal section of the communication line; b) determining whether there is an impairment in the communication line; b1) if it is determined that there is no impairment in the communication line, classifying the communication line into a first group; b2) if it is determined that there is an impairment in the communication line, the method going on with: c) obtaining a location of the impairment in the communication line; d) determining whether the impairment is located in the predetermined terminal section of the communication line based on the loop length (L); d1) if so, classifying the communication line into a second group; d2) else, classifying the communication line into the first group; wherein, if the communication line is classified in the first group, it is qualified for an new broadband communication service, and if the communication line is classified in the second group, it is not qualified for the new broadband communication service, and wherein, the new broadband communication service is to be deployed over the predetermined terminal section of the communication line.

In a preferred embodiment, step b) further comprises requesting the access node and the end-user CPE to perform a Dual End Line Testing, DELT, over the communication line to detect whether there is an impairment in the communication line.

In a preferred embodiment, prior to step b), the method further comprises: determining whether a stability and/or a performance of the communication line suggests an impairment; if so, the method going on with step b); else, classifying the communication line into the first group.

In a preferred embodiment, step c) further comprises requesting the access node and/or the end-user CPE to perform Single End Line Testing, SELT, over the communication line to locate the impairment in the communication line.

In a preferred embodiment, step c) further comprises requesting the access node to perform the SELT with the end-user CPE connected.

In a preferred embodiment, the impairment is at least one of a Bridge Tag, BT, a Degraded Contact, DC, or an Abnormal Attenuation, AA.

In a preferred embodiment, at least one of a BT sensor, a DC sensor, and an AA sensor is used in steps b) and c).

In a preferred embodiment, the predetermined terminal section of the communication line is between the end-user CPE and a potential insertion point of a fiber.

In a preferred embodiment, the loop length (L) is determined based on a rate reach curve.

In a preferred embodiment, the loop length (L) is determined based on a target bitrate of the end user.

According to another aspect of the present invention, there is provided a network analyzer for evaluating a communication line in a Digital Subscriber Line, DSL, network, the communication line connecting an access node and an end-user Customer-Premises Equipment, CPE; the network analyzer being configured to: a) obtain a loop length (L) of a predetermined section of the communication line; b) determine whether there is an impairment in the communication line; b1) if it is determined that there is no impairment in the communication line, the network analyzer being configured to classify the communication line into a first group; b2) if it is determined that there is an impairment in the communication line, the network analyzer being configured to: c) obtain a location of the impairment in the communication line; d) determine whether the impairment is located in the predetermined terminal section of the communication line based on the loop length (L); d1) if so, the network analyzer being configured to classify the communication line into a second group; d2) else, the network analyzer being configured to classify the communication line into the first group; wherein, if the communication line is classified in the first group, it is qualified for an new broadband communication service, and if the communication line is classified in the second group, it is not qualified for the new broadband communication service, and wherein, the new broadband communication service is to be deployed over the predetermined terminal section of the communication line.

In a preferred embodiment, the network analyzer is further configured to request the access node and the end-user CPE to perform Dual End Line Testing, DELT, over the communication line to determine whether there is an impairment in the communication line.

In a preferred embodiment, the network analyzer is further configured to determine whether a stability and/or a performance of the communication line suggests an impairment; if so, the network analyzer being configured to go on with b); else, the network analyzer being configured to classify the communication line into a first group.

In a preferred embodiment, the network analyzer is further configured to request the access node and/or the end-user CPE to perform Single End Line Testing, SELT, over the communication line to locate the impairment in the communication line.

In a preferred embodiment, the predetermined terminal section of the communication line is between the end-user CPE and a potential insertion point of a fiber.

The solution in the present invention focuses on the last portion of the communication line to prequalify the line for an upgrade. It is scalable to a complete network without requiring field intervention (except to repair a detected impairment) and is neither intrusive nor destructive for the existing binders. The impact for the end-user is very limited.

BRIEF DESCRIPTION OF THE FIGURES

The features and advantages of the invention will be more completely understood by appreciating the following detailed description of preferred embodiments with reference to the figures, wherein.

DETAILED DESCRIPTION

Figure 1:
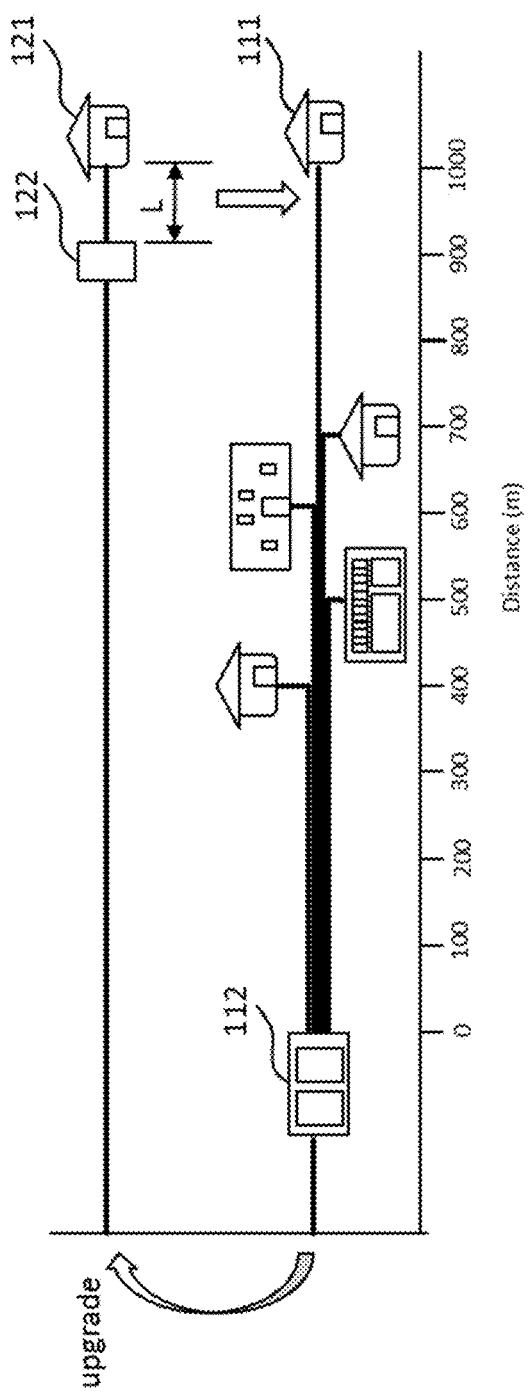
FIG. 1 depicts a schematic diagram explaining an upgrade from DSL to a new broadband communication service.

Exemplary embodiments of the present application are described herein in detail and shown by way of example in the drawings. It should be understood that, although specific exemplary embodiments are discussed herein there is no intent to limit the scope of the invention to such embodiments. To the contrary, it should be understood that the exemplary embodiments discussed herein are for illustrative purposes, and that modified and alternative embodiments may be implemented without departing from the scope of the invention as defined in the claims. Similarly, specific structural and functional details disclosed herein are merely representative for purposes of describing the exemplary embodiments. The invention described herein, however, may be embodied in many alternate forms and should not be construed as limited to only the embodiments set forth herein.

FIG. 1 shows a schematic diagram explaining an upgrade from DSL to a new broadband communication service.

In FIG. 1, the lower part shows an exemplary VDSL network topology according to the state of the art. An end-user CPE 111 is connected to the Subscriber Line Access Multiplexer (DSLAM) 112 via copper wire. The loop length of the copper wire between the end-user CPE 111 and the DSLAM 112 is 1000 m. The DSLAM 112 is connected to further network equipment (not shown), for example, an IP router, via fiber on the left.

The upper part of FIG. 1 shows an exemplary network topology according to a new broadband communication service. In this part of FIG. 1, the access node 122 is connected to further network equipment (not shown), for example, an IP router, via fiber on the left. Comparing to the VDSL network topology, the length of the fiber in the new broadband communication service is extended. However, the access node 122 is still connected to the end-user CPE 121 via copper wire on the right. The length of the copper wire between the access node 122 and the end-user CPE 121 is L.

When a communication line in the DSL network is upgraded to support a new broadband communication service, for example, G. Fast service, the copper wire in the terminal section, i.e. from the end-user CPE to a potential insertion point of a fiber will not be replaced. If there is impairment in the terminal section, the expected bandwidth can not be achieved after the upgrade. Therefore, the present invention provides a method of evaluating a communication line, to prequalify the line for an upgrade.

The method according to the present invention may be implemented as software, hardware or a combination of software and hardware in a network analyzer. The network analyzer may be communicatively coupled to the access node and/or the CPE. Alternatively, the network analyzer may be implemented in the access node, or in the CPE.

Figure 2:
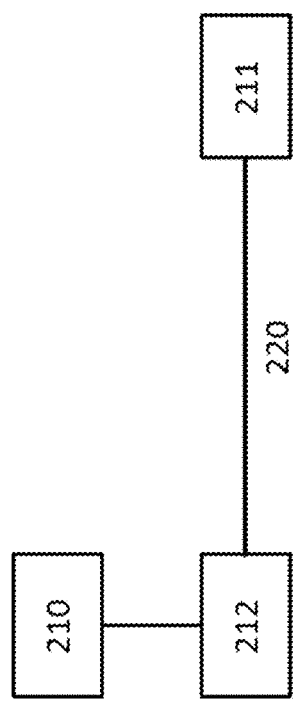
FIG. 2 depicts a schematic block diagram of a network topology according to an embodiment of the present invention.

FIG. 2 shows a schematic block diagram of a network topology according to an embodiment of the present invention.

In FIG. 2, the network analyzer 210 is communicatively coupled to a DSLAM 212. The DSLAM 212 is communicatively coupled to a CPE 211 via a communication line 220 that needs to be evaluated.

In the following, the embodiment of the present invention will be described with respect to the topology shown in FIG. 2.

Figure 3:
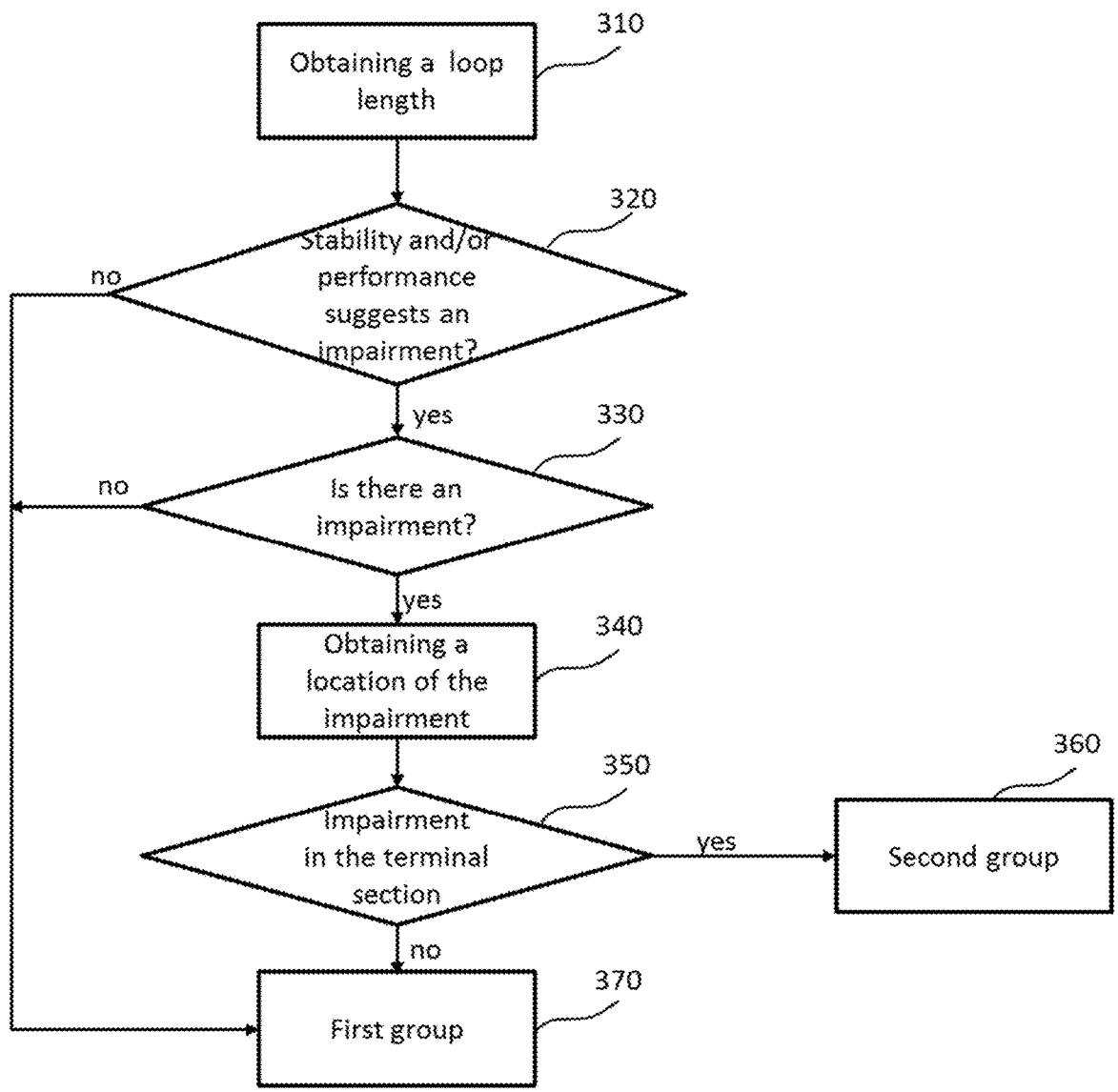
FIG. 3 depicts a schematic flow diagram according to an embodiment of the present invention.

FIG. 3 shows a schematic flow diagram according to an embodiment of the present invention.

In step S310, a loop length L of a predetermined terminal section of the communication line is obtained. Specifically, in one embodiment, the loop length L can be determined by the DSLAM or the CPE and then transmitted to the network analyzer. In another embodiment, the loop length L can be determined by the network analyzer. The predetermined terminal section of the communication line is a section over which a new broadband communication service is to be deployed. The present invention focuses on the predetermined terminal section that may still be used after the upgrade, and aims to determine whether there is impairment in the predetermined terminal section. The loop length L of the predetermined terminal section can be determined in many ways. In one embodiment, the loop length L is determined based on a rate reach curve.

Figure 4:
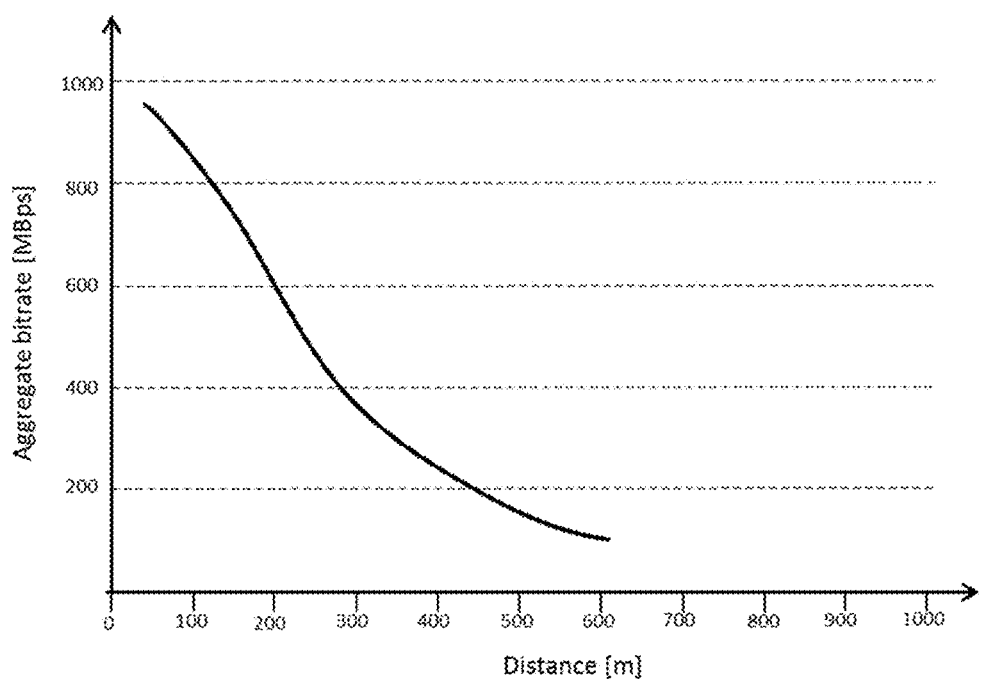
FIG. 4 depicts a schematic rate reach curve for G. Fast service.

FIG. 4 shows a schematic rate reach curve for G. Fast service. A skilled person shall understand, the exact values in the rate reach curve depend on the cable type. FIG. 4 is given for illustration purpose only.

For example, in one embodiment, if an end-user is expecting a minimum aggregated bitrate of 400 Mbps after an upgrade to G. Fast, according to the curve shown in FIG. 4, the loop length L of a predetermined terminal section may be determined as 300 m.

In another embodiment, the loop length L of the predetermined terminal section, i.e., the length of the copper wire between the CPE and a distribution point after the upgrade is predetermined. For example, the copper wire inside a house will not be replaced during the upgrade and it has a known length of 100 m. In this case, the loop length L is determined as 100 m.

In yet another embodiment, an operator may target a minimum bitrate at a maximum distance. For example, some operators might target a minimum of 300 Mbps@300 m. In that case, the loop length L of the predetermined terminal section is 300 m, to ensure the minimum bitrate of 300 Mbps after the upgrade.

Returning to FIG. 3, in step S320, it is determined whether a stability and/or a performance of the communication line suggests an impairment. If the stability and/or performance suggests that impairment exists in the communication line, the method proceeds with step S330. If the stability and/or performance suggests that there is no impairment in the communication line, the method proceeds directly with step S370.

A skilled person shall understand, the step S320 is not essential for the present invention. In another embodiment, the method may directly goes to step S330 after S310.

With step S320, the communication lines in the network can be pre-filtered, so that the number of communication lines, for which steps S330-S360 shall be performed, is reduced. Normally, in a DSL network, only a part of the total number of lines are expected to have impairment, so this pre-filter helps to avoid processing the DELT/SELT on all the lines.

Specifically, in one embodiment, in step S320, the network analyzer determines a first parameter representing a stability of the communication line and a second parameter representing a performance of the communication line. And then the network analyzer determines whether the first parameter achieves a first threshold and whether the second parameter achieves a second threshold. If the first parameter achieves the first threshold and the second parameter achieves the second threshold, it suggests no impairment in the communication line. Otherwise, if the first parameter does not achieve the first threshold or the second parameter does not achieve the second threshold, it suggests that there may be impairment in the communication line.

In another embodiment, the DSLAM (or the CPE) determines the first parameter and the second parameter. Then the DSLAM (or the CPE) transmits the first parameter and the second parameter to the network analyzer. The first threshold and the second threshold may be preconfigured in the network analyzer or transmitted to the network analyzer from the DSLAM (or the CPE).

In yet another embodiment, the DSLAM (or the CPE) determines whether a stability and/or a performance of the communication line suggests an impairment, and transmits the result of the determination to the network analyzer.

Specifically, metrics like Mean Time Between Errors (MTBE) and Mean Time Between Resync (MTBR) can be chosen as the first parameter representing a stability of the communication line.

In one embodiment, knowing the specific xDSL deployment characteristics like bandplan, start and stop frequencies, etc., it's possible to determine a theoretical rate reach curve which is function of the loop attenuation (ADSL) or the Electrical Length (VDSL2). The actual bitrate at the end user (distance known) may be selected as the second parameter, and a percentage or percentile of the theoretical maximum may be selected as the second threshold.

In step S330, it is determined whether there is an impairment in the communication line. If it is determined in step S330 that there is no impairment in the communication line, the method proceeds directly with step S370. If it is determined in step S330 that there is an impairment in the communication line, the method proceeds with step S340.

In one embodiment, the network analyzer may request the DSLAM or the CPE to originate a Dual End Line Testing, DELT, to detect whether there is an impairment in the communication line. And then the network analyzer may request the DSLAM or the CPE to transmit a result of the DELT to the network analyzer. The network analyzer may determine whether there is an impairment in the communication line based on the result of the DELT. Alternatively, the network analyzer may request the DSLAM or the CPE to transmit an indication to the network analyzer, the indication indicating whether there is an impairment in the communication line.

DELT permits to retrieve DSL line showtime parameters and Carrier Data (CD) information like Logarithm of the transfer function magnitude (HLOG). The HLOG is the channel characteristics function meaning it's the frequency response of the DSL line.

According to the state of the art, there are different sensors which permit to detect impairments in a communication line based on the HLOG.

In one embodiment, at least one of a BT sensor, a DC sensor, and an AA sensor is used during the DELT. A skilled person shall understand other sensors no matter known or to be developed in the future may be used during the DELT in the present invention to detect whether there is an impairment in the communication line.

In step S340, a location of the impairment in the communication line is obtained. In one embodiment, the network analyzer may request the DSLAM to originate a Single End Line Testing, SELT, to locate the impairment in the communication line. And then the network analyzer may request the DSLAM to transmit the location of the impairment to the network analyzer. Alternatively, the network analyzer may request the DSLAM to transmit the result of the SELT to the network analyzer, the network analyzer may determine the location of the impairment based on the result of the SELT.

Normally, SELT requires that CPE is not connected on the line. However, a "forced SELT" can be executed with CPE connected. This can be used to detect and locate impairments when the line is in showtime (meaning with CPE connected). A forced SELT consists of locking the port, executing the SELT and unlocking the port, meaning that the line goes out of showtime during the SELT execution (30 seconds to one minute). In the present invention, when SELT is mentioned, it should be understood as "forced SELT" with CPE connected. As when running the tests related to the present invention, it would be quite challenging to have access to each end-customer house to unplug/plug the CPE during a SELT.

The SELT provides the possibility to locate the detected impairments. SELT test is using reflectometry, by injecting a specific pulse signal on the DSL line, the waves propagate into the DSL line and when then encounter a discontinuity (impedance break) a part of their energy is reflected back. By analyzing the reflected signal it's possible to detect impairments like bridge tap, metallic faults (eg: DC) or others like mismatched segments, one wire tap which might results in an abnormal attenuation. In one embodiment, at least one of a BT sensor, a DC sensor, and an AA sensor is used during the SELT. A skilled person shall understand other sensors no matter known or to be developed in the future may be used during the SELT in the present invention to detect and locate the impairment in the communication line.

In another embodiment, a SELT is performed to detect and locate impairment in the communication line in steps S330 and S340.

In another embodiment, the network analyzer may request the CPE to originate the SELT. Usually, the SELT is originated from the DSLAM, but as the DSLAM might be far from the end of the copper loop (for long loops), the energy contained in the echo signal in case of impairment detected at the far end section of the cable is low. It means that the diagnosis and localization of impairments at the far end of a long loop can be difficult or less accurate. Some CPE might contain the capability to run SELT from CPE (refer to U.S. Pat. No. 9,461,704 B2). As in this specific case, running a SELT initiated from the CPE on long loops will provide better results in impairments diagnosis and localization thanks to the higher energy contained in the reflection signal.

In yet another embodiment, the network analyzer may request both the access node and CPE to originate the SELT.

In step S350, it is determined whether the impairment is located in the predetermined terminal section of the communication line based on the loop length L. If the impairment is located in the predetermined terminal section, the method proceeds with step S360. If the impairment is not located in the predetermined terminal section, the method proceeds with step S370.

In step S360, the communication line is classified into a second group, meaning it is not qualified for the new broadband communication service.

In step S370, the communication line is classified into a first group, meaning it is qualified for the new broadband communication service.

Figure 5:
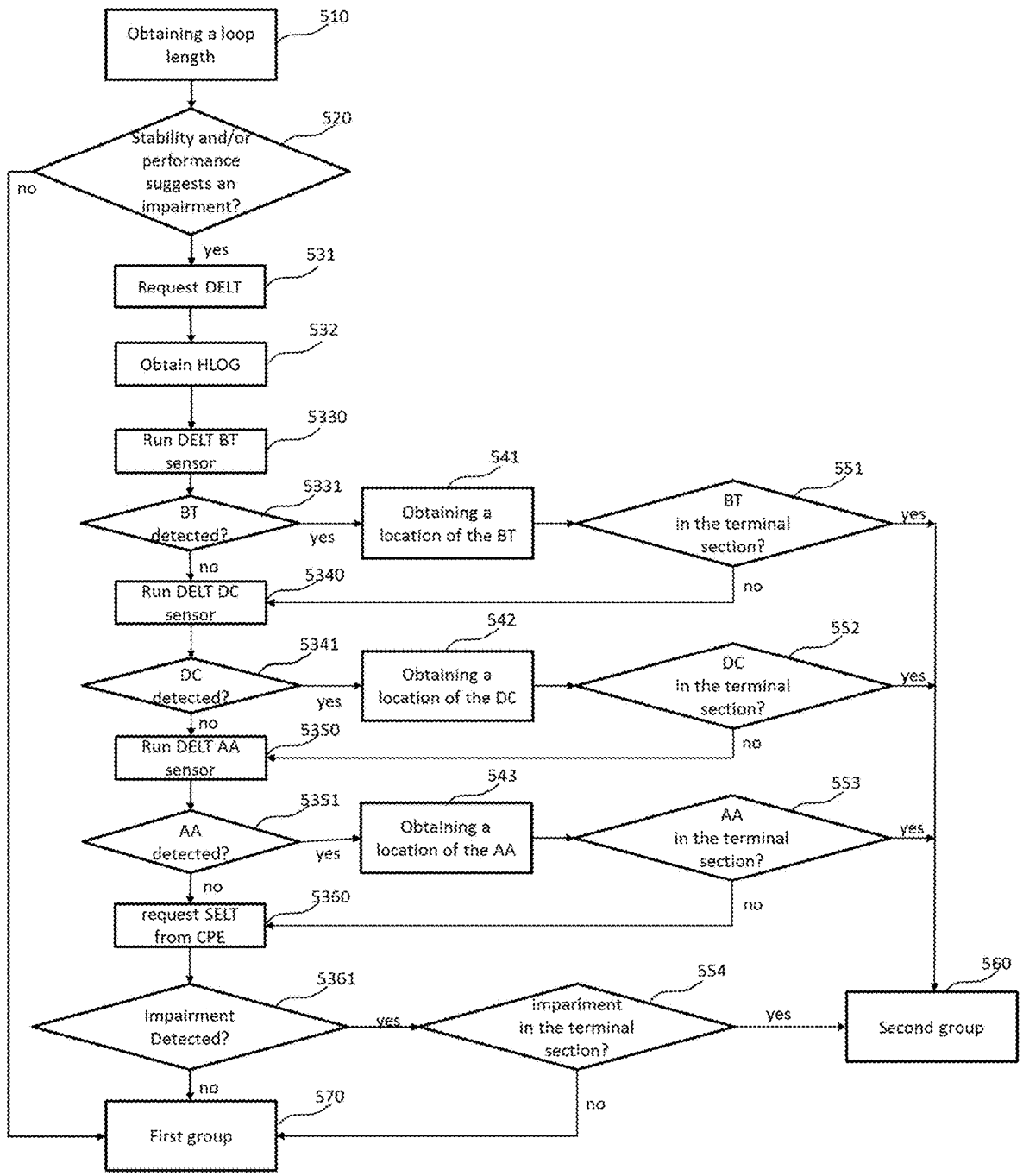
FIG. 5 depicts a schematic flow diagram according to another embodiment of the present invention.

FIG. 5 shows a schematic flow diagram according to another embodiment of the present invention.

In FIG. 5, steps S510 and S520 are similar as steps S310 and S320 described with respect to FIG. 3. After determining that a stability and/or a performance of the communication line suggests an impairment, the method goes on with step S531.

In step S531, the network analyzer requests the DSLAM and CPE to perform a DELT and transmit the result of the DELT including HLOG to the network analyzer. In step S532, the network analyzer obtains the HLOG from the DSLAM. Alternatively, the network analyzer may obtain the HLOG from the CPE.

In step S5330, a DELT BT sensor is run based on the HLOG to detect BT impairment in the communication line. In step S5331, it is determined, whether there is a BT impairment detected. If so, the method proceeds with step S541, else, the method proceeds with step S5340.

In step S541, the network analyzer obtains a location of the BT. Specifically, the network analyzer may requests the DSLAM and/or CPE to perform a SELT on the line with specific BT detection enabled to detect and locate the BT and transmit the location of the BT to the network analyzer. Then in step S551, it is determined whether the BT impairment is located in the predetermined terminal section. If so, the method proceeds with step S560, else, the method proceeds with step S5340.

In step S5340, a DELT DC sensor is run based on the HLOG to detect DC impairment in the communication line. In step S5341, it is determined, whether there is a DC impairment detected. If so, the method proceeds with step S542, else, the method proceeds with step S5350.

In step S542, the network analyzer obtains a location of the DC. Specifically, the network analyzer may requests the DSLAM and/or CPE to perform a SELT on the line with specific Metallic Fault (MF) detection enabled to detect and locate the DC and transmit the location of the DC to the network analyzer. Then in step S552, it is determined whether the DC impairment is located in the predetermined terminal section. If so, the method proceeds with step S560, else, the method proceeds with step S5350.

In step S5350, a DELT AA sensor is run based on the HLOG to detect AA impairment in the communication line. In step S5351, it is determined, whether there is an AA impairment detected. If so, the method proceeds with step S543, else, the method proceeds with step S5360.

In step S543, the network analyzer obtains a location of the AA. Specifically, the network analyzer may requests the DSLAM and/or CPE to perform a SELT on the line with specific Metallic Fault (MF) detection enabled to detect and locate the AA and transmit the location of the AA to the network analyzer. Then in step S553, it is determined whether the AA impairment is located in the predetermined terminal section. If so, the method proceeds with step S560, else, the method proceeds with step S5360.

Advantageously, in step S5360, the network analyzer may request the CPE to originate a SELT and transmit the result of the SELT to the network analyzer. The result of the SELT comprises an indication indicating whether there is an impairment in the communication line, and if necessary an indication indicating the location of the impairment. Then in step S5361 it is determined whether an impairment is detected during the SELT originated from the CPE. If so, the method proceeds with step S554, else, the method proceeds with step S570.

Then in step S554 it is determined whether the impairment is located in the predetermined terminal section. If so, the method proceeds with step S560, else, the method proceeds with step S570.

In step S560, the communication line is classified into a second group, meaning it is not qualified for the new broadband communication service.

In step S570, the communication line is classified into a first group, meaning it is qualified for the new broadband communication service.

According to another aspect of the present invention, the present invention provides a network analyzer. The network analyzer may be implemented in a DSLAM, in a CPE or externally in a test head as an individual product. Alternatively, the network analyzer may be implemented as an external application in an external management server communicatively coupled with the access node and/or the CPE.

The network analyzer is configured to obtain a loop length L of a predetermined section of the communication line. Specifically, in one embodiment, the loop length may be determined by the network analyzer. In another embodiment, the loop length may be determined by other entity in the network and transmitted to the network analyzer.

The network analyzer is configured to obtain a first indication indicating whether there is an impairment in the communication line. Specifically, in one embodiment, the network analyzer may request the access node and the CPE to perform DELT over the communication line to determine whether there is an impairment in the communication line. The network analyzer may request the access node or the CPE to transmit the first indication to the network analyzer.

If the first indication indicates that there is no impairment in the communication line, the network analyzer is configured to classify the communication line into the first group.

If the first indication indicates that there is an impairment in the communication line, the network analyzer is configured to obtain a second indication indicating a location of the impairment in the communication line.

Specifically, in one embodiment, the network analyzer may request the access node and/or the CPE to perform SELT over the communication line to locate the impairment in the communication line. The network analyzer may request the access node or the CPE to transmit the second indication to the network analyzer.

Then the network analyzer is configured to determine whether the impairment is located in the predetermined terminal section of the communication line based on the loop length L. If so, the network analyzer is configured to classify the communication line into a second group. Else, the network analyzer is configured to classify the communication line into the first group.

If the communication line is classified in the first group, it is qualified for an new broadband communication service, and if the communication line is classified in the second group, it is not qualified for the new broadband communication service, and wherein, the new broadband communication service is to be deployed over the predetermined terminal section of the communication line.

Advantageously, the network analyzer is configured to obtain a third indication indicating whether a stability and/or a performance of the communication line suggests an impairment.

Specifically, in one embodiment, the network analyzer may request the other network node to provide parameters representing stability and/or performance of the communication line. Then the network analyzer determines whether the stability and/or performance suggests an impairment in the communication line based on the parameters. In another embodiment, the network analyzer may request the other network node to transmit the third indication to the network analyzer.

If the stability and/or performance suggests an impairment in the communication line, the network analyzer is configured to perform the evaluation according to the present invention for the communication line.

If the stability and/or performance suggests no impairment in the communication line, the network analyzer is configured to classify the communication line into a first group.

The invention claimed is:

1. A method of evaluating a communication line in a digital subscriber line (DSL) network, the communication line connecting an access node and an end-user customer-premise equipment (CPE) method comprising:
    obtaining a loop length of a terminal section of the communication line, the terminal section of the communication line being between the end-user CPE and a potential insertion point of a fiber;
    determining whether there is an impairment in the communication line;
    classifying the communication line into a first group in response to a determination that there is no impairment in the communication line; and
    in response to a determination that there is an impairment in the communication line,
        obtaining a location of the impairment in the communication line,
        determining whether the impairment is located in the terminal section of the communication line based on the loop length,
        classifying the communication line into a second group in response to a determination that the impairment is located in the terminal section of the communication line, and
        classifying the communication line into the first group in response to a determination that the impairment is not located in the terminal section of the communication line,
    wherein, the first group is qualified for a new broadband communication service, and the second group is not qualified for the new broadband communication service, and
    wherein, the new broadband communication service is to be deployed over the terminal section of the communication line.

2. The method according to claim 1, wherein, the determining whether there is an impairment in the communication line further comprises requesting the access node and the end-user CPE to perform a dual end line testing (DELT) over the communication line.

3. The method according to claim 1, further comprising:
    determining whether at least one of a stability or a performance of the communication line suggests an impairment;
    performing the determining whether there is an impairment in the communication line in response to a determination that at least one of the stability or the performance suggests an impairment; and
    classifying the communication line into the first group in response to a determination that the stability and the performance do not suggest an impairment.

4. The method according to claim 1, wherein the obtaining the location of the impairment in the communication line further comprises requesting at least one of the access node or the end-user CPE to perform single end line testing (SELT) over the communication line to locate the impairment in the communication line.

5. The method according to claim 4, wherein the obtaining the location of the impairment in the communication line further comprises requesting the access node to perform the SELT with the end-user CPE connected.

6. The method according to claim 1, wherein, the impairment is at least one of a bridge tag (BT), a degraded contact (DC) or an abnormal attenuation (AA).

7. The method according to claim 1, wherein, at least one of a BT sensor, a DC sensor, and an AA sensor is used in the determining whether there is an impairment in the communication line and in the obtaining the location of the impairment in the communication line.

8. The method according to claim 1, wherein the obtaining the loop length includes determining the loop length based on a rate reach curve.

9. The method according to claim 8, wherein the obtaining the loop length includes determining the loop length based on a target bitrate of the end user.

10. A network analyzer for evaluating a communication line in a digital subscriber line (DSL) network, the communication line connecting an access node and an end-user customer-premises equipment (CPE), the network analyzer configured to:
    obtain a loop length of a terminal section of the communication line, the terminal section of the communication line being between the end-user CPE and a potential insertion point of a fiber;
    determine whether there is an impairment in the communication line;
    classify the communication line into a first group in response to a determination that there is no impairment in the communication line; and
    in response to a determination that there is an impairment in the communication line,
        obtain a location of the impairment in the communication line,
        determine whether the impairment is located in the terminal section of the communication line based on the loop length,
        classify the communication line into a second group in response to a determination that the impairment is located in the terminal section of the communication line, and
        classify the communication line into the first group in response to a determination that the impairment is not located in the terminal section of the communication line,
    wherein, the first group is qualified for a new broadband communication service, and the second group is not qualified for the new broadband communication service, and
    wherein, the new broadband communication service is to be deployed over the terminal section of the communication line.

11. The network analyzer according to claim 10, being further configured to request the access node and the end-user CPE to perform dual end line testing (DELT) over the communication line to determine whether there is an impairment in the communication line.

12. The network analyzer according to claim 11, being further configured to:
    determine whether at least one of a stability or a performance of the communication line suggests an impairment;
    determine whether there is an impairment in the communication line in response to a determination that at least one of the stability or the performance suggests an impairment; and
    classify the communication line into the first group in response to a determination that the stability and the performance do not suggest an impairment.

13. The network analyzer according to claim 11, being further configured to request at least one of the access node or the end-user CPE to perform single end line testing (SELT) over the communication line to locate the impairment in the communication line.

* * * * *